United States Patent
Acker

(10) Patent No.: US 7,781,992 B2
(45) Date of Patent: Aug. 24, 2010

(54) POWER SUPPLY DEVICE FOR AN ELECTRIC MOTOR METHOD FOR OPERATION OF AN ELECTRIC MOTOR

(75) Inventor: Christian Acker, Kilstett (FR)

(73) Assignee: Schaeffler KG, Herzogenaurach (DE)

( * ) Notice: Subject to any disclaimer, the term of this patent is extended or adjusted under 35 U.S.C. 154(b) by 203 days.

(21) Appl. No.: 11/813,929

(22) PCT Filed: Dec. 15, 2005

(86) PCT No.: PCT/DE2005/002260

§ 371 (c)(1),
(2), (4) Date: Mar. 19, 2008

(87) PCT Pub. No.: WO2006/074627

PCT Pub. Date: Jul. 20, 2006

(65) Prior Publication Data

US 2008/0169776 A1    Jul. 17, 2008

(30) Foreign Application Priority Data

Jan. 13, 2005   (DE) .................. 10 2005 001 575

(51) Int. Cl.
*H02P 8/28* (2006.01)
(52) U.S. Cl. .................. 318/105; 318/440; 318/599; 318/370; 318/377; 318/139
(58) Field of Classification Search .......... 318/105, 318/440, 362, 366, 599; 307/18, 43; 123/90.16, 123/90.17, 90.18, 90.19
See application file for complete search history.

(56) References Cited

U.S. PATENT DOCUMENTS

| | | | | |
|---|---|---|---|---|
| 3,903,464 A | * | 9/1975 | Lyon et al. | 318/760 |
| 4,400,624 A | * | 8/1983 | Ebert, Jr. | 307/43 |
| 4,417,191 A | | 11/1983 | Schmidt | |
| 4,641,042 A | * | 2/1987 | Miyazawa | 307/66 |
| 4,937,509 A | * | 6/1990 | Gundlach | 318/362 |
| 5,457,372 A | | 10/1995 | Pignatelli et al. | |
| 5,705,903 A | * | 1/1998 | Hastings | 318/370 |
| 6,836,085 B2 | * | 12/2004 | Kawada et al. | 318/139 |
| 7,032,552 B2 | * | 4/2006 | Schafer et al. | 123/90.17 |
| 7,089,987 B2 | * | 8/2006 | Gonzaga | 157/14 |
| 7,246,580 B2 | * | 7/2007 | Palesch et al. | 123/90.17 |

FOREIGN PATENT DOCUMENTS

| | | |
|---|---|---|
| DE | 3312956 | 10/1984 |
| DE | 282552 | 4/1989 |
| DE | 10257706 | 1/2004 |
| EP | 0791875 | 8/1997 |
| JP | 57113782 | 7/1982 |

\* cited by examiner

*Primary Examiner*—Rita Leykin
(74) *Attorney, Agent, or Firm*—Volpe and Koenig, P.C.

(57) ABSTRACT

A power supply device for an electric motor, operated either in a normal operating mode and/or an emergency operating mode, in particular, for an actuator in a motor vehicle and a method for operation of an electric motor in a normal operating mode and/or an emergency operating mode, in particular, for an actuator in a motor vehicle. The electric motor is powered by AC in the normal operating mode and by DC in the emergency operating mode, in particular, in a fault situation.

26 Claims, 2 Drawing Sheets

Fig. 3

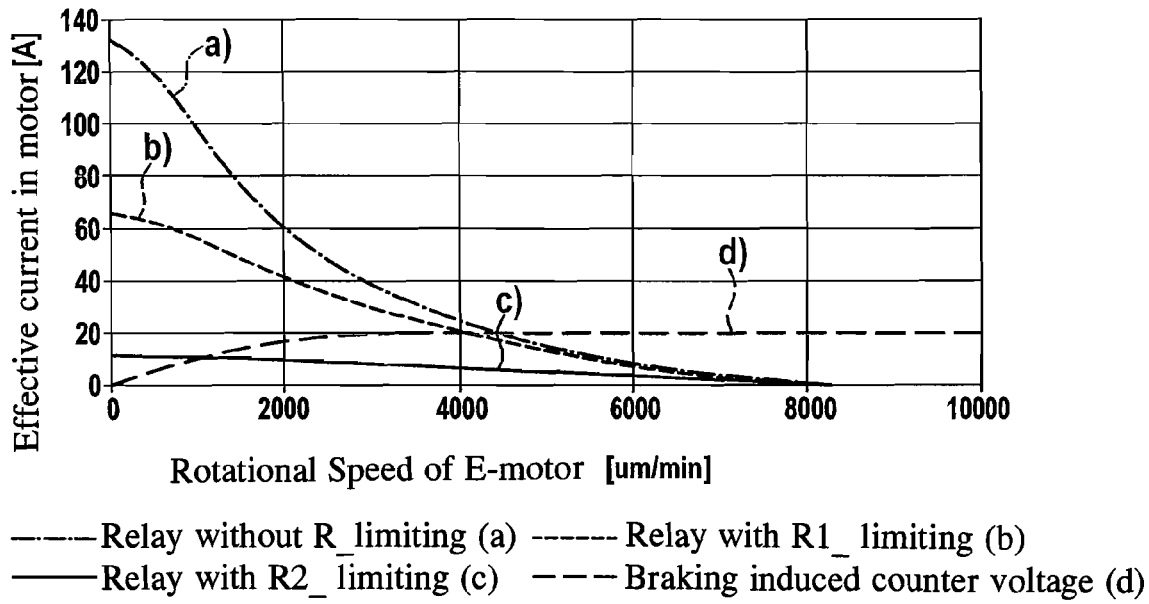

Motor current when brake is short circuited with direct current and Different braking resistance with induced counter voltage —·—Relay without R_limiting (a)   — — —Relay with R1_ limiting (b)
——Relay with R2_ limiting (c)   – – –Braking induced counter voltage (d)

Fig. 4

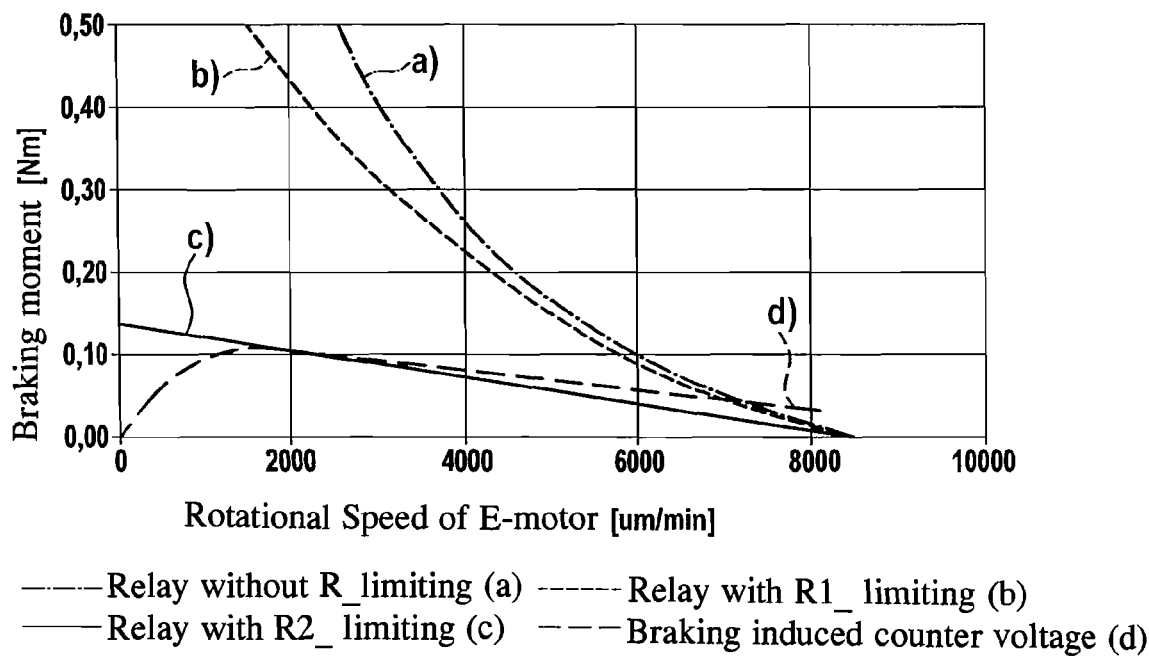

Motor current when brake is short circuited with direct current and Different braking resistance with induced counter voltage —·—Relay without R_limiting (a)   — — —Relay with R1_ limiting (b)
——Relay with R2_ limiting (c)   – – –Braking induced counter voltage (d)

POWER SUPPLY DEVICE FOR AN ELECTRIC MOTOR METHOD FOR OPERATION OF AN ELECTRIC MOTOR

BACKGROUND

The invention relates to a power-supply device for an electric motor that can be operated in a normal operating mode and/or in an emergency operating mode, especially for an actuator in a motor vehicle. The invention also relates to a method for the operation of an electric motor in a normal operating mode and/or an emergency operating mode, especially for an actuator in a motor vehicle.

It is known to adjust the position of adjustable components in a motor vehicle by means of an actuator, in order to control systems in the motor vehicle or to influence and/or trigger system states, especially in a targeted way, for example, in a camshaft or camshaft adjuster for a motor vehicle internal combustion engine or a valve or a valve adjuster for fuel injection. Such motor vehicle actuators have the effect, as is further known, of adjusting the components by means of electric motors (servomotors), for example, by means of known three-phase current motors, such as three-phase current synchronous or asynchronous motors.

A three-phase current asynchronous motor, called asynchronous motor for short below, is an electric motor, which is operated with a three-phase current. Viewed electrically, an asynchronous motor is a short-circuited three-phase current transformer, whose secondary winding (a rotor) is mounted so that it can rotate. Through an operating voltage applied to a stator winding, in the interior of the machine a rotating magnetic field is generated, which induces a current in the short-circuited inner winding (armature). This current itself establishes, in turn, a magnetic field around the rotor. Both magnetic fields interact so that only one torque is generated.

A three-phase current synchronous motor, called synchronous motor for short below, is an electric motor, which is also operated with a three-phase current. On the outside it has a winding, which generates a magnetic alternating field. The rotor carries either permanent magnets or an excitement winding for generating a field. In the synchronous motor, the rotor with the excitation lags the alternating field. In contrast to the three-phase current asynchronous motor, the synchronous machine has no slippage, because no voltages have to be induced in the rotor. Therefore, one can rely on a constant rotational speed for operation on a rigid network.

In modern actuators, the electric motors are usually controlled electronically using electronic control devices, wherein operating states (system states) of the system controlled by means of the electric motor to be controlled and/or the actuator to be adjusted are monitored. If the monitored operating states move within certain, given limits, the monitored system operates in a state usually designated as a normal state.

However, if operating states outside of the limits of the normal operating states are determined, which can be designated, for example, as system faults—in short, if system faults are determined—then the control device usually provides a controller for an emergency operation or emergency operating mode, in order to prevent damages to the controlled system.

Such an emergency mode can be, for example, an adjustment of the component adjustable by the actuator into a safe position, also designated as a fail-safe position. For example, here an electronic camshaft adjuster is known for a motor vehicle combustion engine in which, if there is a fault, the electric motor of the actuator is separated by a controller and the electric motor sets the camshaft into the fail-safe position—if possible at a target adjustment speed to be maintained—such that the combustion engine can still be operated at least with emergency operation properties.

The start-up of the fail-safe position or the adjustment into the fail-safe position can be caused, for example, by a restoring spring on the actuator. A disadvantage is that the restoring spring leads to over-dimensioning of the adjustment system. Another disadvantage is that in the normal operation of the electric motor, the spring force must be overcome, which leads to a higher load in normal operation and/or to higher driving costs of the adjustment system.

The start-up of the fail-safe position can be further caused, for example, by a second (electric) motor connected in parallel. However, this is associated with high technical extra requirements and/or considerable extra costs.

The fail-safe position can be further caused, for example, by a short-circuiting of the (electric) motor, which causes braking of the motor. The braking principle is based on an induced counter voltage of the motor and is therefore dependent on the rotational speed. At smaller rotational speeds, there is no longer a braking moment holding the adjustment system in the fail-safe position, if this position is reached at all. Here, applicant reserves the right to divide the safety concepts for achieving fail-safe positions from the present invention and to pursue them within the scope of sub-applications as standalone subject matter.

SUMMARY

The objective of the present invention is to realize an operation of an electric motor, in which an emergency operation concept or reaching a fail-safe position is reached easily, safely, and cost-effectively.

The objective is met by a power-supply device for an electric motor that can be operated in a normal operating mode and/or in an emergency operating mode and also by a method for operating an electric motor in a normal operating mode and/or emergency operating mode with the features of the respective independent claims.

The power-supply device according to the invention for an electric motor that can be operated in a normal operating mode and/or in an emergency operating mode, especially for an actuator in a motor vehicle, has a power-supply unit, by means of which the electric motor can be supplied with three-phase current in the normal operating mode. Furthermore, it has an emergency operation power-supply unit, by which the electric motor can be supplied with direct current in the emergency operating mode.

In the method according to the invention for operating an electric motor in a normal operating mode and/or emergency operating mode, especially for an actuator in a motor vehicle, the electric motor is supplied with three-phase current in the normal operating mode. In the emergency operating mode, especially in a fault situation, the electric motor is supplied with direct current.

Advantageous embodiments and refinements are the subject matter of the dependent claims. The subject matter of the subordinate claims relates both to the power-supply device according to the invention for the electric motor that can be operated in the normal operating mode and/or in the emergency operating mode and also to the method according to the invention for operating the electric motor in the normal operating mode and/or in the emergency operating mode.

It is to be noted that units and/or devices designated as such can be realized both as physical units and/or devices and also as purely functional, virtual units and/or devices or both in hardware and also in software.

The power-supply unit of the electric motor, especially a three-phase current motor, such as a three-phase current asynchronous motor or a three-phase current synchronous motor, can be designed preferably such that a stator of the electric motor can be supplied with three-phase current in the normal operating mode.

The emergency operation power-supply device of the electric motor can be further designed such that the stator, especially at least two or three phases of the stator, are supplied with direct current in the emergency operating mode, wherein the stator supplied in the emergency operating mode with direct current can then generate in the emergency operating mode a non-rotating and/or stationary magnetic field.

Through the non-rotating and/or stationary magnetic field generated by the stator by the applied direct current, in an especially preferred way a braking moment is generated in the electric motor, which brakes the electric motor, especially a rotor of the electric motor, independent of the rotational speed and/or up to a standstill.

In an especially preferred way, when the electric motor is braked, a motor vehicle actuator is moved into a safe position, especially an emergency operation position or a fail-safe position. The braking moment and therefore the movement or adjustment speed is thus directly dependent on the current flowing in the phases.

Furthermore, it can be preferably provided that the motor vehicle actuator is held in the safe position by the non-rotating and/or stationary magnetic field and/or by the braking moment generated by this field. Holding the safe position over time is to be guaranteed with minimal power consumption, in order to minimize the energy consumption, to make an optimum setting for the braking moment, and to protect the electric motor from high temperatures.

For this purpose, it can be provided in an especially preferred way that the power consumption, i.e., the direct moment and/or the braking moment, with which the electric motor can be braked, and/or a movement speed when moving the motor vehicle actuator into the safe position can be set.

For this purpose, at least one or more relays and/or one or more limiting resistors can be provided. Also, at least one or more transistors, especially controllable transistors, such as FETs or Low-Side FETs, can be provided. For example, the transistors can be pulse-width modulated (PWM) with 20 kHz.

Here, it is further provided that the controllable transistor or transistors is or are used in the normal operating mode also for a power end stage, especially in the electric motor and/or the motor vehicle actuator.

Preferably it is further provided that the power-supply unit has an alternating current source or a direct current source, especially a battery, such as a motor vehicle battery, especially for an onboard motor vehicle power supply, with a power end stage, especially an open DC-AC end stage, for example, a current inverter.

In an especially preferred refinement, the electric motor is a three-phase current motor, such as an asynchronous motor or a synchronous motor, especially for a motor vehicle actuator, such as a parallel switching transmission (PSG) or a camshaft adjuster.

In an especially preferred way, it is further provided that the emergency operation power-supply unit also has a direct-current source, especially a battery, such as a motor vehicle battery, especially for an onboard motor vehicle power supply. In particular, it is provided that the power-supply unit and emergency operation power-supply unit use the same direct-current source.

In an especially preferred way, the device further includes a switching unit, which causes, especially for a given system state of an overall technical system, such as here, for example, the parallel switching transmission (PSG) or the camshaft adjuster system, with the motor vehicle actuator, a switch-over from the normal operating mode into the emergency operating mode, especially by short-circuiting the electric motor, wherein, in particular, the overall system is brought into a safe state.

The device can have a state monitoring device, which monitors the system states and/or recognizes a given system state, especially a fault state.

The invention or its refinements can be used especially in a particularly preferred way for moving a motor vehicle actuator into a safe position and/or for holding a motor vehicle actuator in a safe position (emergency operation concept).

In this way, in the emergency operating mode a non-rotating magnetic field is generated by the direct current in the stator. Therefore, a braking moment independent of rotational speed is further generated in the electric motor, through which the electric motor or the rotor in the electric motor is braked to a standstill.

When the electric motor brakes, the motor vehicle actuator is moved into the safe position, the fail-safe position, or the motor vehicle actuator is held in the safe position by the braking moment in the electric motor. Here, it is clear that the electric motor of a motor vehicle actuator is used as a direct-current brake in emergency operation or in fail-safe positions.

It can also be further provided that a given situation of an overall system adjustable by the motor vehicle actuator is recognized and the electric motor is switched into the emergency operating mode from the normal operating mode by short circuiting when a given situation is recognized.

BRIEF DESCRIPTION OF THE DRAWINGS

Embodiments of the invention shall be explained with reference to the figures below. Shown are:

FIG. 3 a diagram with curves showing a relationship between a rotational engine speed and a motor current for different emergency operation systems; and FIG. 4 a diagram with curves showing a relationship between a rotational engine speed and a braking moment for different emergency operation systems.

DETAILED DESCRIPTION OF THE PREFERRED EMBODIMENTS

Figure 1:
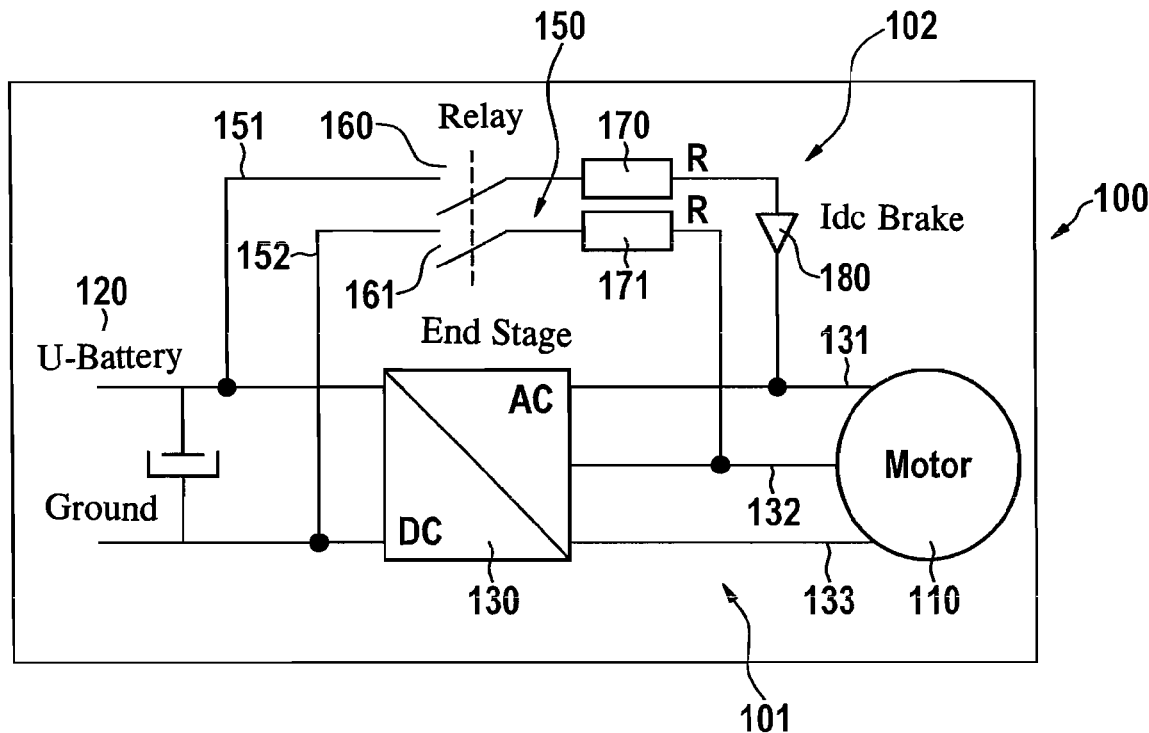
FIG. 1 a view of a first embodiment of an emergency operation system according to the invention with a relay for a motor vehicle actuator.

In FIG. 1, a first embodiment, a braking method, or emergency operation system with a relay for electric motors is shown for motor vehicle actuators in the normal or emergency operating mode. FIG. 1 shows a circuit 100 for an electric motor for a motor vehicle actuator for a normal operating mode and for an emergency operating mode, for example, for an electronic camshaft adjustment.

In this circuit 100, as FIG. 1 shows, in the normal operating mode 101, a three-phase current motor 110, in this case an asynchronous motor 110, is supplied with three-phase current by a battery 120, for example, an onboard motor vehicle battery 120, and a (power) end stage 130, in this case an open DC-AC stage 130. FIG. 1 shows the corresponding switching of the phases 131, 132, 133 of the asynchronous motor 110 for the normal operating mode 101.

This circuit 100 further provides an emergency operating mode 102 with corresponding switching, in which if there is a fault, the asynchronous motor 110 is separated by a controller (not shown) and the motor vehicle actuator is moved into a fail-safe position. For the emergency operating mode 102 or the corresponding switching, the circuit 100 provides a short circuit 150, through which the power end stage 130 is short circuited if there is a fault.

FIG. 1 here shows the short circuit 150 at two phases 131, 132 of the asynchronous motor 110, wherein this can be switched accordingly also to three phases of the asynchronous motor 110. This short circuit 150 has in this case two line sections 151, 152, which each have a switchable relay 160, 161 and also a given limiting resistor 170, 171.

Through this short circuit 150, the stator of the asynchronous motor 110 (in the emergency operating mode) is supplied by the onboard voltage 120 with direct current, which is shown in FIG. 1 by Idc brake or brake current 180, wherein it generates a non-rotating magnetic field. This stationary magnetic field brakes the rotating rotor of the asynchronous motor 110 up to a standstill and holds the motor vehicle actuator in the fail-safe position. The braking moment and therefore the adjustment speed (also braking time) are here dependent on the current flowing in the phases.

Here, holding the fail-safe position over time can be guaranteed with minimum power consumption due to the power consumption adjustable by the relay 160, 161 and also by the limiting resistors 170, 171, in order to minimize the energy consumption, to set the braking moment optimally, and to protect the asynchronous motor 110 against high temperatures.

Figure 2:
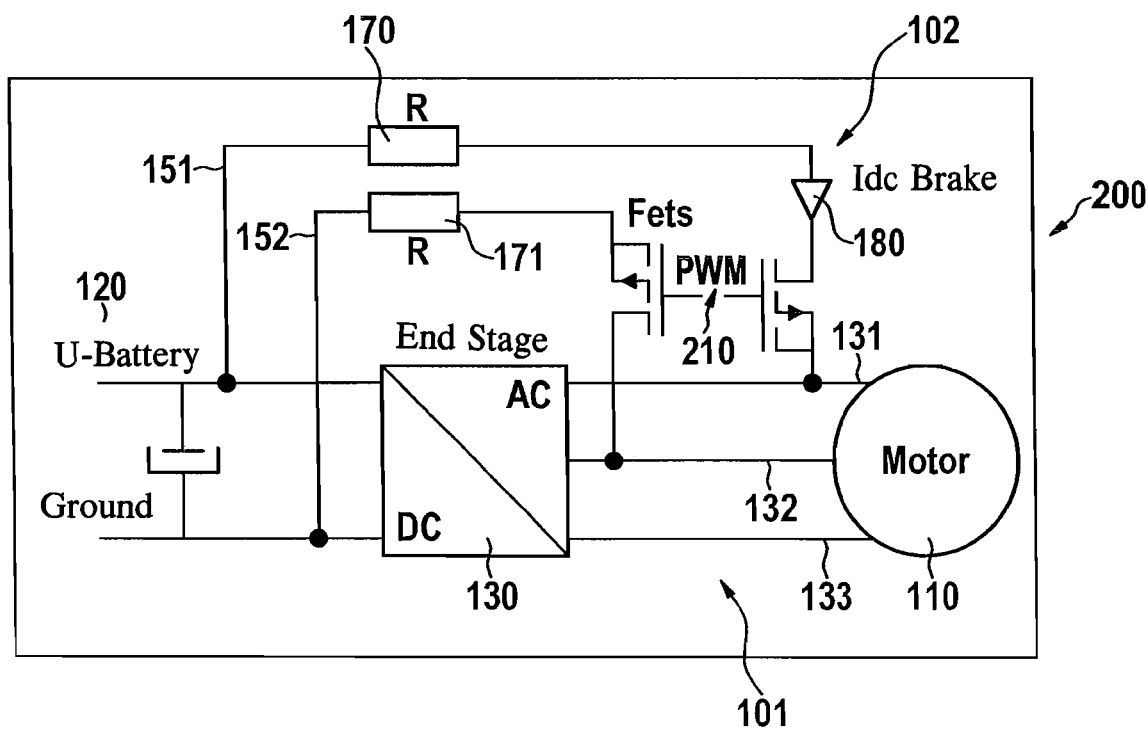
FIG. 2 a view of a second embodiment of an emergency operation system according to the invention with FETs for a motor vehicle actuator.

In FIG. 2 a second embodiment, a braking method or emergency operation system with FETs for electric motors for motor vehicle actuators in the normal operating mode or emergency operating mode is shown. FIG. 2 shows a circuit 200 corresponding in function to the circuit 100 for the asynchronous motor 110 in the motor vehicle actuator for the normal operating mode 101 and for the emergency operating mode 102, at which the power consumption can be adjusted by means of controllable transistors 210, in this case Low-Side FETs 210, which can come from the power end stage used in the normal operating mode.

The control of the FETs 210 is realized in a pulse-width modulated (PWM) manner, here, for example, with 20 kHz and acts like an end stage switch for the end stage 130. Incidentally, circuit 200 corresponds to circuit 100.

FIG. 3 and FIG. 4 show braking currents (FIG. 3) and braking moments (FIG. 4) or corresponding profiles or curves each as a function of the rotational engine speed for the emergency operation concept with a relay without limiting resistor (curve a)), for the emergency operation concept with a relay with small limiting resistor (curve b)), and for the emergency operation concept with a relay with a large limiting resistor (curve c)) (cf. circuit FIG. 1) and also for the (rotational speed-dependent) emergency operation concept based on an induced counter voltage of the motor (curve d)).

LIST OF REFERENCE SYMBOLS

100 Circuit
101 Normal operating mode or normal operating mode circuit
102 Emergency operating mode or emergency operating mode circuit
110 Asynchronous motor
120 Battery
130 Power end stage
131, 132, 133 Phases of the asynchronous motor
150 Short circuit
151, 152 Line sections
160, 161 Relay
170, 171 Limiting resistor, braking resistor
180 Idc brake or braking current
200 Circuit
210 Low-Side FETs

The invention claimed is:

1. Power-supply device for an electric motor that can be operated in a normal operating mode and/or in an emergency operating mode, for an electric camshaft adjuster, comprising:
   a camshaft adjuster with an electric motor;
   a power-supply unit, which supplies the electric motor with three-phase current in the normal operating mode, and
   an emergency operation power-supply unit, which supplies the electric motor with direct current in the emergency operating mode to brake the electric motor and place the camshaft adjuster in the emergency operating mode.

2. Device according to claim 1, wherein the power-supply unit provides a stator of the electric motor with three-phase current in the normal operating mode and the emergency operation power-supply unit supplies at least two or three phases of the stator with direct current in the emergency operating mode.

3. Device according to claim 1, wherein the stator is supplied with direct current in the emergency operating mode and forms a non-rotating and/or stationary magnetic field in the emergency operating mode.

4. Device according to claim 1, wherein a braking moment, which brakes a rotor of the electric motor or holds it in a given position, is generated by a non-rotating and stationary magnetic field and/or the electric motor is braked independent of rotational speed and/or up to a standstill.

5. Device according to claim 1, wherein upon braking the electric motor, the electric camshaft adjuster is moved into a safe position, an emergency operation position or a fail-safe position.

6. Device according to claim 5, wherein the electric camshaft adjuster is held in the safe position by a non-rotating and/or stationary magnetic field and/or by a braking moment.

7. Device according to claim 1, wherein the electric motor is switchable to a short circuited condition in the emergency operating mode.

8. Device according to claim 1, wherein the emergency operation power-supply unit has an adjustment unit, with which the direct current and/or a braking moment, with which the electric motor can be braked, and/or a movement speed can be set when moving the electric camshaft adjuster into a safe position.

9. Device according to claim 8, wherein the adjustment unit has at least one relay and/or one or more limiting resistors.

10. Device according to claim 8, wherein the adjustment unit has at least one transistor or controllable transistors.

11. Device according to claim 10, wherein the controllable transistor or transistors is an FET or are FETs, which can also be used in a power end stage, of the electric motor and/or the motor vehicle actuator, in the normal operating mode.

12. Device according to claim 1, wherein the power-supply unit has an alternating current source or a direct current source, and a power end stage.

13. Device according to claim 1, wherein the electric motor is a three-phase current motor, which is an asynchronous motor or a synchronous motor.

14. Device according to claim 1, wherein the emergency operation power-supply unit is a direct current source.

15. Device according to claim 14, wherein the battery comprises a motor vehicle battery.

16. Device according to claim 1, wherein the device has a switching unit, which causes, in a given system state of an overall technical system having the electric motor, a switch over from the normal operating mode to the emergency operating mode, by short circuiting the electric motor, wherein the overall system is brought into a safe state.

17. Device according to claim 16, wherein the device has a state monitoring device, which monitors the system states and/or recognizes a given system state.

18. Method for operating an electric motor of an electric camshaft adjuster in a normal operating mode and/or emergency operating mode in a motor vehicle, comprising:
supplying the electric motor with three-phase current in the normal operating mode and
supplying the electric motor with direct current in the emergency operating mode, braking the electric motor for moving the electric camshaft adjuster into a fail-safe position.

19. Method according to claim 18, further comprising in the normal operating mode supplying a stator of the electric motor with direct current and in the emergency operating mode supplying at least two or three phases of the stator with direct current.

20. Method according to claim 18, wherein in the emergency operating mode the stator forms a non-rotating and/or stationary magnetic field and/or generates a braking moment and/or the electric motor is braked independent of rotational speed and/or up to a standstill.

21. Method according to claim 20, further comprising short circuiting the electric motor in the emergency operating mode.

22. Method according to Claim 18, further comprising holding the motor vehicle actuator in the safe position by the non-rotating and/or stationary magnetic field.

23. Method according to claim 18, wherein the direct current and/or the braking moment, with which the electric motor is braked, and/or a movement speed is set when the electric camshaft adjuster moves into the fail-safe position, such that power consumption and/or energy consumption of the electric motor is minimized and/or overheating of the electric motor is prevented.

24. Method according to Claim 18, further comprising monitoring the system states of the overall monitoring system and recognizing the given system state.

25. Method according to claim 18, further comprising holding the electric camshaft adjuster in the fail-safe position, wherein in the emergency operating mode a braking moment is generated in the electric motor, through which the electric motor is braked, and when the electric motor is braked, the electric camshaft adjuster is moved into the fail-safe position or the motor vehicle actuator is held in the fail-safe position by the braking moment in the electric motor.

26. Method according to claim 18, wherein the method is used for moving the electric camshaft adjuster in the fail-safe position and/or for holding the electric camshaft adjuster in the fail-safe position, wherein a given situation of an overall system adjustable by the electric camshaft adjuster is recognized, the electric motor is switched for a recognized given situation by short circuiting from the normal operating mode into the emergency operating mode, and in the emergency operating mode a braking moment is generated in the electric motor, which brakes the electric motor up to a standstill, such that during braking the electric camshaft adjuster is moved into the fail-safe position, and/or the electric camshaft adjuster is held in the fail-safe position by a braking moment.

* * * * *